Figure 1:
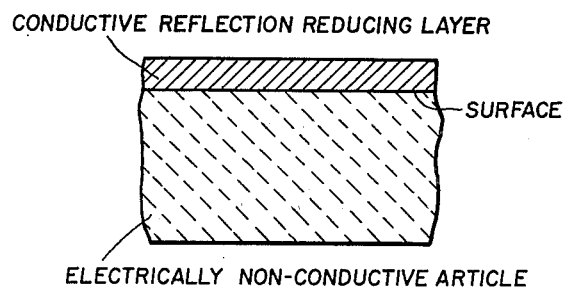

INVENTOR
HUBERT SCHRÖDER

United States Patent Office 3,094,436
Patented June 18, 1963

3,094,436
TRANSPARENT, CONDUCTIVE, REFLECTION-REDUCING COATINGS ON NON-CONDUCTIVE OBJECTS AND METHOD
Hubert Schröder, Wiesbaden, Germany, assignor to Jenaer Glaswerk Schott & Gen., Mainz, Germany, a corporation of Germany
Filed Aug. 26, 1960, Ser. No. 52,042
Claims priority, application Germany Sept. 1, 1956
6 Claims. (Cl. 117—215)

The instant invention relates to electrically non-conductive articles and objects, constructed of such materials as glass and synthetics, the surfaces of which have been coated with electrically conductive transparent coatings, to methods of making and applying these electrically conductive transparent coatings and to the production of articles having such coatings thereon.

This application is a continuation-in-part of application Serial No. 680,632, filed on August 27, 1957, and now abandoned.

It is known that glass objects may require for certain specific purposes a conductive transparent coating. This requirement, for instance, exists with screens for cathode-ray tubes. While the present invention is not limited to any specific use, it finds particular utility with plate glass, china, porcelain, artificial resinous materials, ceramic or the like. The coatings may be in the form of a single coating or multiple coatings, depending upon the light modifying characteristics and electrical conducting characteristics desired.

Electrically conductive transparent coatings have been used for glass and synthetic materials, that is, for materials which are non-absorbent or only slightly absorbent. These coatings have been made of oxides of tin and indium, to which in some cases accelerators such as antimony or zinc have been added. One drawback resulting from the use of tin and indium oxides, however, is that these materials have a refractive index which is considerably higher than, for example, the refractive index of the common plate glass, so that the surface layers resulting from the application of the coatings show in most cases an increase in reflection of the supporting base. In order to overcome this usually undesirable quality, it has already been proposed to make the coating of an indium compound which contains oxygen and fluorine, for example InOF. The refractive index of this indium compound may be reduced by the addition of a tin accelerator to almost 1.52.

The use of this indium compound is far from satisfactory, since it does not reduce the reflection from the articles and objects, that is, the reflection of the underlying glass and synthetic materials are not desirably modified. The problem of reducing the reflection of glass is well known in the art, and several suggestions have been made to overcome this difficulty.

In a scientific treatise, reference has been made to the possibility of making glass non-reflective by providing it with a thin, strongly absorbent coating. The choice of the material to be used for the coating has been a problem, because, although it would seem that the highly conductive metals would be advisable for this purpose, they have the disadvantage, aside from several other difficulties, of resulting in an unavoidable loss of light due to absorption to an extent of at least 14% per unit of surface area. Therefore, these coatings, made of highly conductive metals, are practically of no value.

Another suggestion has been made with respect to reducing the reflection of the surface of the dielectric bodies, namely the use of insulating layers of non-conductive materials. These insulating layers, used for the purpose of either reducing the reflection or for totally eliminating the reflection of transparent, conductive coatings, are however attended by other disadvantages, as for example by the fact that the conductive coatings would be exposed at the point of support of the electrode. Furthermore, the insulating properties of the materials would prevent any loss of electricity from the surfaces and accumulation of electrical charges would result. The accumulated electrical or static charge is dispelled very slowly, if at all, and this disadvantage is a very serious one, because it is an essential requirement that static charges be neutralized for many purposes including the avoidance of the attraction of dust particles. Many instruments of the type which incorporate sensitive needle-type indicating means are less efficient if the cover picks up static charges.

It is an object of the instant invention to provide a non-conductive material or object, such as of glass or synthetic material, with a conductive, transparent coating which also has the advantage of reducing the reflection of the material or object.

Another object of this invention is to make this transparent coating of non-metallic material.

Still another object of the instant invention is to provide a coating which, even when it effectively reduces the reflection, still retains at least in the outermost layer sufficient conductivity in order to insure proper connection with electrodes which may be applied to it and in order to prevent the formation of static charges.

A further object of this invention is the provision of electrically conductive coatings, which may be applied at much lower temperatures than has been possible with the known conductive coatings. This permits the application of transparent conductive layers upon synthetic materials, which previously could not be treated in such a manner due to temperature sensitivity.

A still further object of the instant invention is to provide coatings of the above mentioned character, which may be uniformly applied in a simple, efficient and economical manner and which will be resistant to aging, discoloration and mechanical abrasion.

Further objects and advantages of this invention will appear more fully from the following description and examples.

Figure 2:
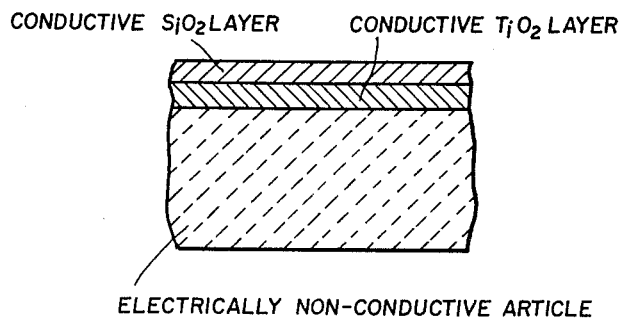

In the drawings:
FIG. 1 illustrates a non-conductive object having a single conductive film coating thereon; and
FIG. 2 illustrates a non-conductive object having two different film coatings superposed thereon.

The present invention is directed to the provision of coatings of the above mentioned character, which possess a high degree of transparency, durability, stability and electrical conductivity. Coatings in accordance with the invention are formed from partially hydrolyzed organic titanium or silicon compounds. The compounds of the invention may be prepared, for instance, from incompletely saponified organic titanic or silicic acid esters, but other decomposable silicon or titanium compounds such as any alkyl silicates, silicanes or substituted silanes resp. the corresponding titanium compounds may also be used in an incompletely hydrolyzed condition. In the same manner esters of higher homologues or isomers, as, f.i., iso-butylates of silicon and titanium are practical starting-compounds. Furthermore, it is not necessary to have fourfold-substituted compounds (e.g. tetra-methyl-orthosilicate), but double- or tripple-substituted compounds, such as di- or tri-chloro-alkylates, have likewise been found useful. The compounds are preferably diluted with an organic solvent such as ethyl alcohol, ethyl acetate, methylene chloride and the like. The purpose of the incomplete hydrolysis is to provide a material which is either excess-semiconducting or defect-semiconductive. It is well known that in a solid, composed for instance of oxides, if the proportions of the cations exceed the stoichiometric ratio, an excess-semiconducting condition arises. This may be the results of the incorporation of metallic atoms or reducing agents. If, on the other hand, oxygen is in excess in the solid lattice, a defect-semiconducting condition arises. The partial hydrolysis produces within the coating disturbing points or, more clearly, centers of increased mobility of the electrons. In practice, solutions of partially hydrolyzed organic titanic or silicic acid esters may be applied in the liquid form upon the object to be coated. Subsequent heating converts the esters into semi-conducting titanium or silicon oxide coatings.

In order to achieve partial hydrolysis, the organic titanic or silicic acid esters may be hydrolyzed with an amount of water, which is less than the stoichiometric amount required to achieve complete hydrolysis. Alternately, the same result, i.e. partial hydrolysis, may be achieved by using the stoichiometric amount of water, but adding to the reaction mixture a monomer ester or a reducing agent. Carbohydrates are suitable as reducing agents according to the invention, as for example glycol, glycerine and derivatives of the same, saccharoses or hexoses. These partially hydrolyzed compounds contain not only hydroxyl and eventually halogen radicals, but still retain some organic radicals. The degree of hydrolysis may be varied over a wide range. Factors to be considered are the nature of the organic radical, the temperature to which the coated object is subjected in order to convert the organic compound into an oxide coating, and the speed with which the conversion is carried out. Usually a degree of hydrolysis resulting in a 1:10 ratio of organic radicals to the negative groups, i.e. hydroxyl and halogen groups, is very satisfactory, but higher or lower ratios may be suitable.

During the heating step, the partially hydrolyzed silicon resp. titanium compound decomposes, producing an oxide. For example, from the silicic acid esters there is obtained an oxide of the composition $SiO_x$, wherein $x$ is a number of less than 2. In this case, the negative element, oxygen, is present in an amount less than the stoichiometric ratio, and an excess-semiconductive layer is produced. The layer so obtained has the propery of exhibiting a low refractive index, one which is lower than that of glass. This single layer causes a reduction of reflection where the thickness of the layer is in the order of a quarter medium wave length of visible light. Thus, according to the invention, a simple low-refractive layer of thickness about $\frac{1}{4}\lambda$, or an uneven multiple thereof, where $\lambda$ is equal to the median wave length of light, is obtained.

The low-refractive layer, consisting essentially of silicon oxide, is satisfactory for many purposes if the desired reduction of reflection and the degree of conductivity are not too great. In some instances, however, it may be desired to increase the conductivity over the value which is attainable with just a silicon oxide layer or layers. For this purpose, small amounts of conductivity-increasing materials, as for example metallic salts may be added. As is known from the technique of semi-conductors, such ingredients act as activators in the lattice for the releasing of electrons. Nitrates, chlorides resp. oxychlorides of Fe, Zn, Mo, In, Sn, Cd or Sb have been found to be quite effective, but other salts or compounds may be suitable, too. The amount of these metallic salts should be controlled, because in great amount they may undesirably increase the refraction of the final coating.

Insofar as temperatures have to be applied which do not considerably exceed 150° C., for example for treating synthetic materials, it has been found advisable to apply a siliceous coating, the final porosity of which may be modified, i.e. as to have submicroscopically small pores or inclusions which contain traces of water, because they readily absorb water by capillary attraction. Such coating may be obtained, for example, by adding ingredients to the coating solution which volatilize when the film is heated. Urea and camphor are examples of suitable materials to be added to the coating solution, because they volatilize readily when the film is heated.

According to another embodiment of the invention, it is possible, if the reflection has to be reduced to a great extent, to apply a plurality of the transparent conductive layers instead of a single layer. At the same time, the use of a plurality of layers allows the achievement of an increase in the conductivity and elimination of static forces.

A layer consisting of titanium oxide or of a mixture of a titanium oxide with silicic acid is known to be suitable in the case of high and medium refractive components. According to the instant invention, however, these layers are prepared from an excess-conductive titanium oxide, in which the number of oxygen atoms is lower than the stoichiometric amount. These layers of an excess-conductive titanium oxide may be easily prepared according to the invention by the incomplete hydrolysis of a titanium ester, which has been applied in the liquid film to the object to be coated, and by heating the liquid film. The residual organic radicals will act on the object as disturbing points, i.e. they will produce an excessive-semiconductive or, in the presence of an oxidizing agent, a defect-semiconductive material. These disturbing points may also be produced by addition of organic or inorganic materials which are difficult to volatilize. In order to facilitate the conductivity, the outer layer should be made in accordance with the invention so as to achieve a low electric resistance.

The results obtainable in accordance with the invention are of a surface-resistance in the order of $10^5$ ohms per square unit, accompanied by a complete lack of absorption and a very substantial reduction in reflection.

The coatings prepared in accordance with the invention afford very high optical qualities, minimize or eliminate reflection, do not cause accumulation of electric charges and are highly electrically conductive.

According to another embodiment of the invention, the antireflection qualities of double coatings are greatly improved if the article or object is pre-coated with a base layer having a refractive index of approximately 1.8 and a thickness of about 1400 Angstrom units, as for example, is taught in U.S. Patent No. 2,478,385. This base layer may be composed of a mixture of $TiO_2$ and $SiO_2$ and is produced, for instance, by using solutions which contain silicic acid esters together with titanium compounds. Other non-absorbent materials of suitable refraction, such as $ZrO_2$ or $SnO_2$, are likewise useful. Moreover, it is now also possible to combine the highly conductive transparent coatings of the prior art, which, when used per se, display undesired reflection qualities, in combination with the electrically conductive coatings according to the invention in order to reduce reflection effectively and yet to maintain electric efficiency.

Thus, in accordance with the invention, a glass object having, for instance, a refractive index of 1.52 may be coated with a highly conductive film of tin oxide of a thickness of $\lambda/4$, to which a certain amount of cadmium oxide or indium oxide fluoride has been added in order to give a refractive index of 1.79, a superimposed layer of titanium oxide which has a thickness of $\lambda/2$ and which causes the formation of disturbing points, i.e. centers of semi-conductivity, because it has been prepared by the incomplete hydrolysis of titanium organic esters, and a slightly conductive upper layer of silicon oxide prepared from the incomplete hydrolysis of silicic acid esters of a thickness of $\lambda/4$. The two outer layers should have a sufficiently low resistance to leakage.

While the titanium dioxide layers prepared according to the prior art did not show any substantial conductivity, efficient semi-conductive layers of titanium oxide may be prepared according to the invention. This is accomplished preferably by applying solutions of incompletely hydrolyzed titanium organic esters, as described above, and heating the coated material, e.g. glass article, to temperatures of up to 400–500° C. under conditions which prevent substantial contact with air. Thus, it has proved to be advantageous to first dry the applied coating of partially hydrolyzed titanium ester at 50–100° C. and thereafter to superimpose the top layer of low-refractive silicic acid, as described above. Both coatings are heated subsequently up to 400–500° C., whereby the top layer presumably acts as a protective coating so that the formation of the semi-conductive condition by reducing reactions in the titanic layer may be favored.

Another suitable procedure, which makes possible the incorporation of incompletely hydrolyzed titanium compounds within the coating, provides that the two steps, i.e. the deposition and drying of the coating, be carried out in an atmosphere of low humidity. The optimum degree of humidity depends on the drying speed and the nature of the ester, i.e. alkyl radicals in the ester moiety. In most cases, however, a relative humidity of not more than 30–40%, at a room temperature of 25° C., is satisfactory. A protective atmosphere during the drying process, consisting of gases of low oxygen and low water content, e.g. nitrogen or hydrogen, likewise favors the formation of an excess-conductivity. Also, an irradiation of the liquid film by ultraviolet or short-wave rays of light aids the proposed reactions. Furthermore, the addition of a reducing agent to the solution applied is advantageous in most cases.

The following examples are illustrative of the invention:

*Example 1*

2 parts by volume of tetramethyl orthosilicate are diluted with 5 parts of ethyl alcohol and mixed with 1 part of water. When the specific viscosity of the solution has increased by a factor of about ten, further reaction is stopped by the addition of at least 6 parts of monomer methylsilicate and 1 part of dichloro-dibutyl-stannate. This solution is sprayed or spun upon a glass slab which has been pre-heated or, after spraying and spinning, heated as quickly as possible up to 450–500° C. If the thickness of the coating produced in this manner amounts to about a quarter wave-length of visible light, it will show a reflection reduction, clear light transmission and at the same time a noticeable conductivity in the order of $10^{-2}$ to $10^{-1} \Omega^{-1}$ cm.$^{-1}$.

*Example 2*

A solution is prepared by adding 1 part of glycerine, or of a hexose soluble in alcohol such as glucose etc., to 10 parts of titanium tetrabutylate, diluted with 50 parts of ethyl alcohol. In a room, equipped with air of 25° C. and 30% humidity, the glass slide to be coated is sprayed with a sufficient amount of this solution at such a rate that the finished coating has an optical thickness of $\lambda/4$ or $\lambda/2$ for visible light, which can easily be determined by a simple test procedure. After a one-minute drying period at 80° C., the sample is immediately dipped into the solution described in Example 1 and withdrawn from the latter solution at a rate which produces a coating of an optical thickness of $\lambda/4$ for the finished top coating. Subsequently, the glass is baked at 450° C. for about three minutes. The conductivity of the double coating may attain the order of $1$–$10^2 \Omega^{-1}$ cm.$^{-1}$. Instead of spraying the titanium ester solution, it is also possible to apply the same on the glass object by other methods, for instance immersion.

The reflection reducing effect of the double layer described in Example 2 may be improved if the glass slide is precoated with a $\lambda/4$-layer consisting of indium oxide fluoride, to which tin oxide has been added to give a refractive index of about 1.79. The method for producing such layers is well known and disclosed, for instance, in the German Patent No. 934,848. Another possibility for manufacturing a base coating having this refractive index is to use a mixture of solutions which contain silicon and titanium esters as described above, and to choose the ratio of the two esters by a few experiments so as to give the desired refraction of the finished coating.

While the applications of the coatings hereinabove described are to a great extent concerned with cover glasses or plastics of instruments, another important use exists in the field of electro-luminescence, where the electrodes for the voltage applied to a luminescent cell may be formed of such coatings in order to pass a high percentage of the light produced.

In most cases, where it is desired to prevent the formation of static charges on covers of instruments, it is sufficient to use the coatings described without any accessory; if, however, such charges arise at a high rate, it may be advantageous to apply metallic bus bars at the borders of the coating and to earth such bus bars.

It is to be understood that the forms of the invention described and shown herein are to be taken as preferred embodiments of the same and that various changes may be resorted to without departing from the spirit of the invention or the scope of the appended claims.

I claim:

1. A non-conductive object having a non-metallic, transparent, conductive, reflection-reducing film coating on a surface thereof, said coating consisting of at least one electrically, semi-conductive oxide formed from the partial hydrolysis of a member selected from the group of silicon and titanium organic compounds, the total thickness of the coating being of the order of about $\frac{1}{4}\lambda$, $\lambda$ being a median wave length of visible light.

2. A non-conductive object according to claim 1, wherein said organic compound is an ester.

3. A non-conductive object according to claim 1, wherein the partial hydrolysis product of said organic compound has a ratio of organic radicals to negative radicals of 1:10.

4. A non-conductive object having at least two non-metallic, transparent, superimposed film coatings applied on a surface thereof, at least one of said coatings consisting of an electrically conductive oxide formed by the partial hydrolysis of a member selected from the group consisting of silicon and titanium organic compounds, the total thickness of the coating being of the order of about $\frac{1}{4}\lambda$, $\lambda$ being a median wave length of visible light.

5. The method of producing a non-conductive object having a conductive non-metallic, transparent, reflection-reducing coating on a surface thereof, which comprises forming such a coating on said object by applying to said surface a solution of an organic compound selected from the group consisting of titanic and silicic acid esters and mixtures thereof in its partially hydrolyzed form, and heating the film thereby formed on said surface to convert said partially-hydrolyzed organic compound into its corresponding oxide, whereby an electrically conductive coating is formed on said object.

6. Method according to claim 5, which comprises effecting the partial hydrolysis of said organic compound by hydrolyzing said compound with a stoichiometric amount of water and thereafter adding a reducing agent.

References Cited in the file of this patent

UNITED STATES PATENTS

| | | |
|---|---|---|
| 2,432,484 | Moulton | Dec. 9, 1947 |
| 2,761,797 | Young | Sept. 4, 1956 |